(12) United States Patent
Dupe et al.

(10) Patent No.: US 12,043,407 B2
(45) Date of Patent: Jul. 23, 2024

(54) MEASUREMENT DEVICE WITH DUAL DATA ACQUISITION CIRCUITS

(71) Applicant: Airbus Operations (S.A.S.), Toulouse (FR)

(72) Inventors: Nicolas Dupe, Toulouse (FR); Nicolas Jean, Toulouse (FR); Cyrille Dajean, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 246 days.

(21) Appl. No.: 17/705,526

(22) Filed: Mar. 28, 2022

(65) Prior Publication Data
US 2022/0324586 A1    Oct. 13, 2022

(30) Foreign Application Priority Data

Mar. 30, 2021    (FR) ...................................... 2103282

(51) Int. Cl.
*B64D 45/00*     (2006.01)
*G01P 5/16*      (2006.01)
*H04L 12/40*     (2006.01)

(52) U.S. Cl.
CPC ................ *B64D 45/00* (2013.01); *G01P 5/16* (2013.01); *H04L 12/40* (2013.01); *H04L 2012/4028* (2013.01)

(58) Field of Classification Search
CPC ...... B64D 45/00; G01D 11/245; G01D 21/00; G01M 9/062; G01M 9/065; G01P 5/16; H04L 12/40; H04L 12/40013; H04L 12/40195; H04L 2012/4028; H04L 67/125
See application file for complete search history.

(56) References Cited

U.S. PATENT DOCUMENTS

| | | | | |
|---|---|---|---|---|
| 5,375,471 | A * | 12/1994 | Blazic ................ | G01M 5/0083 73/767 |
| 6,593,900 | B1 * | 7/2003 | Craven .................. | H01Q 1/38 343/742 |
| 2011/0138900 | A1 * | 6/2011 | Kwa ..................... | G01M 9/065 73/147 |

(Continued)

FOREIGN PATENT DOCUMENTS

| FR | 3 015 664 A1 | 6/2015 |
|----|-------------|--------|
| FR | 3 034 862 A1 | 10/2016 |

OTHER PUBLICATIONS

French Search Report for Application 2103282 dated Jan. 21, 2022.

*Primary Examiner* — Tyler J Lee
(74) *Attorney, Agent, or Firm* — KDW Firm PLLC

(57) ABSTRACT

A measurement device includes a substrate having accommodations with an emerging opening in which sensors are provided, the substrate including a cavity with a flexible printed circuit. The device is installed on a surface to characterize a fluid flow at this surface. The circuit uses hierarchized buses comprising two data communication buses emerging at the two longitudinal ends of the substrate and an internal data acquisition bus, the bus linking control circuits, each control circuit being connected to one of the communication buses, the sensors being connected to the bus in a distributed fashion on either side of each control circuit. The data from the sensors can be transmitted to the two surrounding circuits and may be acquired if one of them is faulty.

14 Claims, 2 Drawing Sheets

(56) References Cited

U.S. PATENT DOCUMENTS

| | | | |
|---|---|---|---|
| 2014/0014403 A1* | 1/2014 | Miller | H01G 11/84 |
| | | | 174/260 |
| 2017/0355449 A1 | 12/2017 | Bapat et al. | |
| 2019/0193863 A1* | 6/2019 | Abdollahzadehsangroudi | ............ |
| | | | B64D 15/20 |
| 2020/0031454 A1 | 1/2020 | Wilkens | |
| 2020/0115060 A1* | 4/2020 | Hartzler | B64D 15/12 |

* cited by examiner

MEASUREMENT DEVICE WITH DUAL DATA ACQUISITION CIRCUITS

CROSS-REFERENCE TO RELATED APPLICATION

This application claims priority to French patent application number 2103282 filed on Mar. 30, 2021, the entire disclosure of which is incorporated by reference herein.

TECHNICAL FIELD

The disclosure herein relates to a measurement device able to be attached onto a surface of a mobile object or of a fixed object situated within a fluid flow in order to measure physical quantities. More particularly, the disclosure herein is applicable to the measurement of parameters used to characterize a flow of air on the surface of an aircraft.

BACKGROUND

During test flights, sensors are mounted on the external surface of an aircraft in order to perform various types of measurement. The study of the results allows the behaviour of an aircraft in flight to be understood and the performance characteristics thereof to be improved or validated. According to one particular application, it is possible for example to detect and localize aerodynamic phenomena on the aircraft.

A measurement device is known from the patent application FR3015664, filed by Airbus Operations SAS, comprising a substrate having accommodations with an opening emerging to the outside within which sensors are provided. The substrate comprises a cavity in which a flexible printed circuit is accommodated on which a single control circuit is provided directly connected to each of the sensors. The measurement devices may be linked so as to be distributed over a large area such as that of a wing section. The control circuits are accordingly connected together. When a control circuit receives data from the sensors to which it is connected, it assembles it and transmits it to the next control circuit. However, if one of the control circuits fails, it is not possible to recover the data from the sensors for which it is responsible and also from those that follow.

SUMMARY

An aim of the subject matter herein is to disclose a measurement device allowing the data from most of the sensors of the circuit to be recovered in the case of a failure of a control circuit intended to acquire it and communicate it. For this purpose, the disclosure herein relates to a measurement device comprising a substrate having accommodations with an emerging opening within which sensors are provided, the substrate comprising a cavity within which a flexible printed circuit is accommodated wherein the circuit uses hierarchized buses comprising two data communication buses emerging at the two longitudinal ends of the substrate and an internal data acquisition bus, the bus linking control circuits, each control circuit being linked to one of the communication buses, the sensors being linked to the bus in a distributed fashion on either side of each control circuit, all of the sensors between two control circuits transmitting their data to both control circuits surrounding them.

In this way, when a control circuit is faulty, the neighboring control circuits can take over.

The disclosure herein provides at least one of the following optional features, taken individually or in combination.

Each control circuit comprises a housing of longilineal shape whose longitudinal direction is orthogonal to the longitudinal direction of the printed circuit.

The sensors are disposed on a line parallel to the longitudinal direction of the circuit and parallel to the buses.

The sensors are disposed on a line parallel to the longitudinal direction of the circuit and parallel to the buses.

The disclosure herein also relates to a measurement system comprising at least one measurement device having one or more of the aforementioned features, a central unit connected to a measurement device, at least one end device comprising a line termination impedance.

It comprises a loopback device comprising a loopback bus one of the ends of which is connected to the bus and the other end to the bus.

It comprises an extension device comprising a flexible printed circuit comprising a single control circuit at one of the connection ends of the circuit connected to the loopback bus and sensors connected to at least one bus itself or themselves connected to the circuit.

The extension device comprises two acquisition buses, the sensors being connected to one or the other of the buses.

The bus of the end and extension device is connected to the communication buses of the measurement device by an anisotropic conducting film.

The disclosure herein also relates to a fixed or mobile object having a surface located in a flow stream with a measurement system having one or more of the aforementioned features.

The loopback ends of the measurement devices are installed upstream of the flow of the air stream around the aircraft.

The object is an aircraft.

The disclosure herein also relates to a measurement method comprising a measurement system having one or more of the aforementioned features, wherein all of the sensors connected to the acquisition bus between two control circuits, respectively referred to as primary and secondary circuits, transmit their data to the two circuits via the acquisition bus, one of the circuits, the primary circuit, transmitting the data from the sensors to the unit via the communication buses.

When the unit no longer receives data from a primary circuit, it hands over to the corresponding secondary circuit for the sensors in question.

The secondary circuit monitors the activity of the bus connecting it to the associated primary circuit and, in the absence of activity, informs the unit which then requests the secondary circuit to transmit the data from the sensors in question to it.

BRIEF DESCRIPTION OF THE DRAWINGS

Other aims, features and advantages will become apparent from the description of the disclosure herein that follows, which description is presented solely by way of non-limiting example, with reference to the appended drawings in which.

Figure 3:
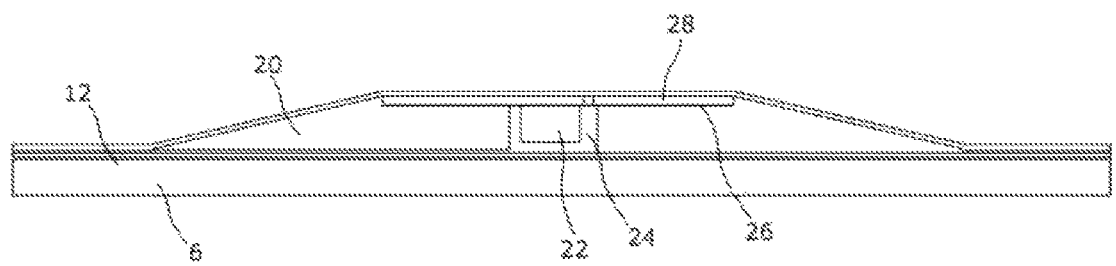
Figure 4:
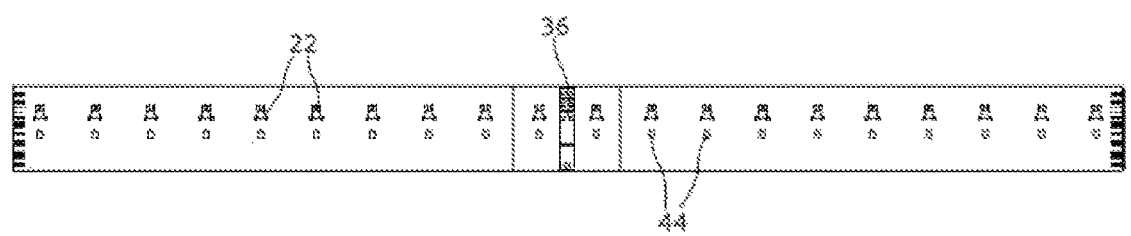
Figure 5:
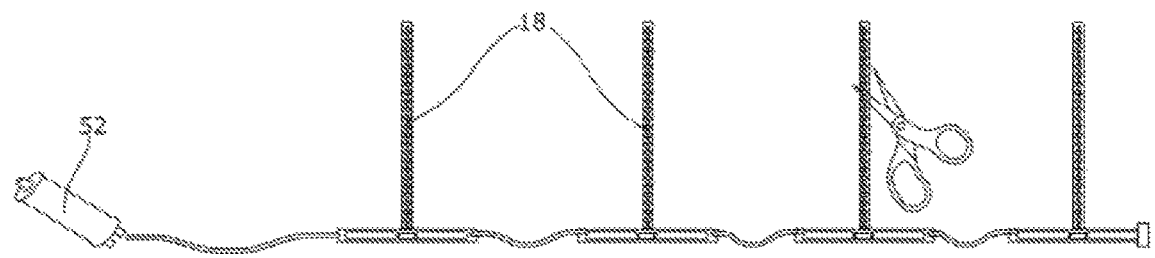

for reasons of simplification, the entirety of the components and links is not shown;

FIG. 3 is a simplified schematic view as a transverse cross section of a measurement device of a system according to the disclosure herein;

FIG. 4 is a simplified top view of a printed circuit of a measurement device according to the disclosure herein; and FIG. 5 is a simplified schematic view of the arrangement of electronic components and of the connections between the components according to one embodiment of a measurement system according to the disclosure herein adapted to the installation on complex geometrical shapes.

DETAILED DESCRIPTION

Figure 1:
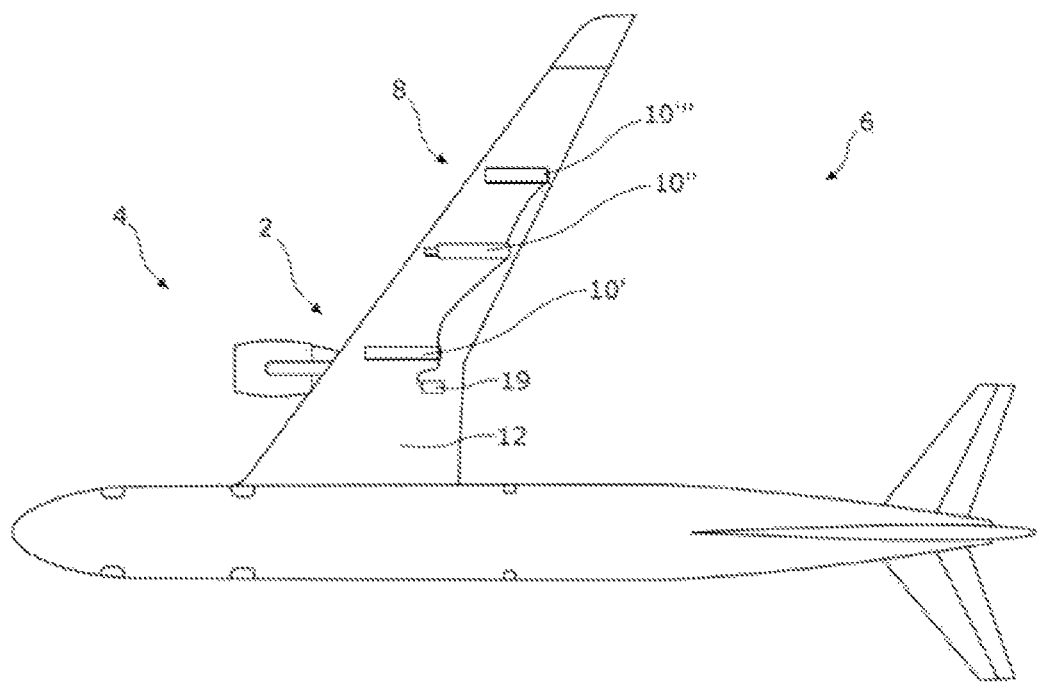
FIG. 1 is a partial top view of an aircraft on the wing sections of which a measurement system according to the disclosure herein is installed.

According to one illustrative application shown in FIG. 1, the measurement system 2 according to the disclosure herein equips a given area 4 of an aircraft 6: in the example illustrated, the system is installed on the wing sections 8. The system 2 has several parts, the third part being optional. The first part consists of or comprises a device 10 for measuring various physical quantities able to be mounted onto a surface 12 on the exterior of the aircraft and, in the example as seen above, on the external surface of the wing sections 8 of the aircraft. A measurement system 2 may comprise one or more measurement devices 10 denoted in FIGS. 1 and 2 by the references 10', 10", 10''', the measurement devices 10 being linked so as to form a daisy-chain of devices allowing measurements to be carried out over a large area. The second part terminates a measurement device 10 either by a loopback device 16 or by an end device 17. The loopback device 16 provides the link between the emerging buses of the substrate as will be seen hereinbelow. The end device 17 terminates the last measurement device 10 of a chain of measurement devices 10: it comprises a line termination impedance allowing the electrical line formed by the succession of measurement devices to be terminated. The third part consists of or comprises an extension device 18 also provided at the end of a measurement device. At the end of a measurement device is located either a loopback device 16 or an end device 17 or an extension device 18. The extension device 18 consists of or comprises a device which, like the measurement device 10, is capable of performing measurements. However, it does not exhibit all the features of a measurement device 2: it is breakable so as to adapt the length of the measurement device 10 with which it is associated to the environment in which it is installed. The fourth part consists of or comprises a central unit 19 for supplying the measurement device or devices 10 and extension device or devices 18, and also for acquisition of the signals coming from the measurement device or devices 10 and the extension device or devices 18. The supply and acquisition unit 19 is situated inside the aircraft and, in the example illustrated, inside the wing section. The unit 19 may be composed of a single block or of several blocks as in the form illustrated in which it comprises a power supply unit 19A and an independent acquisition unit 19B, the units 19A and 19B being linked. Indeed, the power supply unit 19A may be an already-existing power source of the aircraft. The measurement system 2 comprises, successively, the power supply and acquisition unit 19, one or more measurement devices 10'-10''' and one or more loopback devices 16, an end device 17 and/or one or more extension devices 18.

The measurement device 10 shown in FIG. 3 as a transverse cross section takes the form of a flexible substrate 20 for sensors 22 allowing it to be molded to the contours of the aircraft 6. Each sensor 22 is designed to measure physical quantities such as, by way of illustrative and non-limiting examples, pressure, temperature, acceleration, mechanical forces, etc. The sensors 22 may be grouped within units allowing the measurement of several quantities to be carried out, for example in a microelectromechanical system known as MEMS. In the following part, the multi-parameter measurement units of the MEMS type will be referred to as sensors 22. The purpose of the substrate 20 is to provide a shroud for the sensors, which accordingly do not need any particular envelope, and to hold the sensors as close as possible to the surface on which the measurement device is disposed in order to carry out the measurements. The substrate may be made of a polymer material, for example polyurethane or flexible silicone, in order to mold to the contours of the aircraft. This material also allows thermal stresses to be absorbed. It may be formed by molding, machining or any other known fabrication process.

Figure 2:
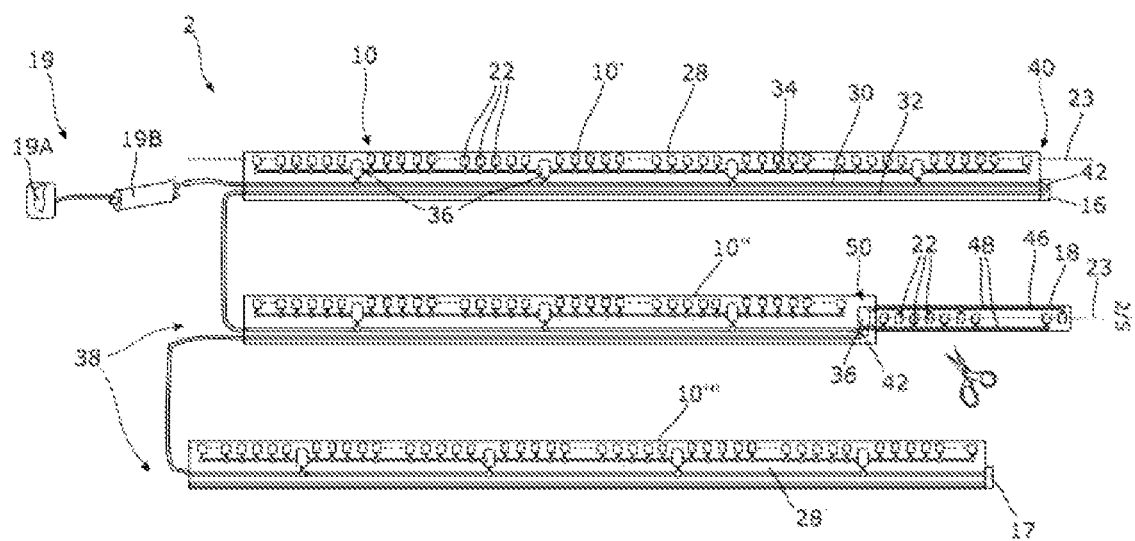
FIG. 2 is a simplified schematic view of the arrangement of electronic components and of the connections between the components according to one embodiment of the measurement system according to the disclosure herein.

The substrate 20 may take any given shape. In the example illustrated, the substrate has a longilineal shape with a trapezoidal transverse cross section. As indicated, the substrate could take another shape. The sensors 22 are accommodated in the central part of the substrate which is thicker. The substrate 20 can receive a plurality of sensors 22. The sensors 22 are distributed in a uniform manner or otherwise over the whole or part of the length of the substrate 20. According to one embodiment of the disclosure herein illustrated in FIG. 2, the sensors 22 are distributed in a uniform manner. Each sensor 22 is separated from the neighboring sensor by a distance that avoids any interference in their operation. As shown in FIG. 2, the sensors 22 are for example disposed along the same line 23 parallel to the longitudinal direction of the substrate. Accommodations 24, shown in FIG. 3, are provided in the substrate 20 for receiving the sensors 22: each accommodation 24 receives one sensor 22.

As illustrated in FIG. 3, the substrate 20 has a cavity 26 formed in the substrate. The cavity 26 receives a flexible printed circuit 28 (commonly referred to as flex PCB for Printed Circuit Board or flex circuit). The cavity 26 has a shape corresponding to that of the circuit 28 and is molded to the forms of this circuit. In the example illustrated, the circuit 28 has a longilineal shape matching that of the substrate 20. The circuit 28 and the substrate 20 follow the same longitudinal direction. In the measurement devices 2, the circuit 28 is accommodated within the cavity opening into the accommodations 24 into which the sensors 22 connected to the circuit 28 are inserted. The sensors are distributed over the circuit 28. Receiving areas are included providing connection points onto which the connection points of the sensor 22 to the integrated circuit 28 are soldered. The detailed architecture of the substrate 20 will not be described in more detail because it is not the subject of this patent application. Architectures such as those of the aforementioned patent are already known.

As shown in FIG. 2, the flexible printed circuit 28 uses hierarchized buses, namely comprises two data communication buses 30, 32 emerging at the two longitudinal ends of the substrate 20 and an internal data acquisition bus 34 to which each sensor 22 of the substrate is connected, the bus 34 linking control circuits 36, the control circuits 36 being distributed between the sensors 22 (or more precisely between the links of the sensors 22 with the bus 34) and connected to one of the data communication buses 30. The connections of the sensors 22 with the bus 34 are distributed on either side of each control circuit 36. In this way, the sensors 22 between two control circuits 36 transmit their data to the two control circuits 36 surrounding them as will be described in more detail hereinbelow. In the embodiment illustrated, the connections of the sensors 22 with the bus 34 are distributed uniformly, namely there is the same number of sensor connections on either side of a circuit 36. In the embodiment illustrated, the buses 30, 32 and 34 are parallel to one another and to the longitudinal direction of the circuit 28. They are also parallel to the line 23 of the sensors 22. Longitudinally, the substrate 20 comprises two ends 38, 40. At one of its ends, called end of daisy-chain 38, the buses 30 and 32 are connected from one substrate to the other by any known type of means, for example a soldered electrical wire. At the other end, called loopback end 40, the buses 30 and 32 of the same substrate are connected either by a loopback device 16, or by an end device 17, or by an extension device 18. In the case of an end device 17, the buses 30 and 32 are connected via the line termination impedance. The loopback device 16 or the extension device 18 connects the ends of the two buses 30 and 32 located on the same side longitudinally at the loopback end 40. The loopback device 16 and the extension device 18 each comprise a bus 42 forming a loop: when the device 16 or 18 is affixed to the measurement device 10, the bus 42 at one of its ends is in contact with the end of the bus 30 and the other of its ends is in contact with the end of the bus 32. If there is only one measurement device 10 or for the first device 10 of a chain of measurement devices 10, the end of the bus 30 at the daisy-chain end 38 is connected to the central unit 19. For the other measurement devices, the end of the bus 32 on the side of the daisy-chain end 38 is connected to the bus 30 of another measurement device 10. The loopback ends 40 of the measurement devices are installed upstream of the flow of the flow stream to be characterized, here the flow stream of air around the aircraft, with respect to the daisy-chain ends 38. For this reason, there is no connection between substrates upstream likely to modify the flow and interfere with the measurements of the sensors 22. The connections between measurement devices are made downstream.

The control circuits 36 receive the measurements made by all of the sensors 22 located on either side of each of the latter. For the two end control circuits 36 constituting the first and the last of the bus 34 and located in the embodiment illustrated as close as possible to each of the longitudinal ends 38, 40 of the substrate, the data from the sensors 22 located between the end 38 or 40 and the corresponding circuit 36 are only acquired by a single circuit 36. For all the other circuits 36, the data transmitted by the sensors 22 to the bus 34 included between two circuits 36 are acquired by the two circuits 36 surrounding them. The sensors send the data from the two sides of the bus 34 to the two circuits surrounding them. One of the two control circuits 36 is designated as primary because it is responsible for sending the data received from the sensors 22 in question to the unit 19. The other of the two control circuits 36 is referred to as secondary because it also receives the data from the sensors but only sends it in the case of a malfunction of the primary circuit. There are two levels of monitoring of each primary circuit. Each control circuit 36 has its own address and identifies itself to the central unit 19 with its address. In a first level of monitoring, if a primary circuit 36 no longer responds to the unit 19 because of a malfunction and if the latter no longer receives any data from a primary circuit 36, the unit 19 inhibits the primary circuit 36 and requests the neighboring secondary circuit 36 to transmit to it the data from the sensors attached to the defective circuit 36. It is the secondary circuit which then takes over and transmits the data received from the sensors in question. In a second level of monitoring, the secondary control circuit 36 monitors the sensors managed by the corresponding primary control circuit 36. If the secondary circuit 36 detects an absence of activity on the bus connecting it to the primary circuit, it informs the unit 19 of this so that, in the same way as previously, the latter inhibits the primary circuit 36 and requests the secondary circuit 36 to transmit to it the data from the sensors attached to the faulty circuit 36. Thus, in the embodiment illustrated, for all the sensors surrounded by two control circuits, the control circuit 36 plays a primary role for all the sensors located on its right and a secondary role for all the sensors located on its left. Each control circuit 36 is both primary and secondary depending on the sensors in question. In this way, if one of the circuits 36 fails, another circuit 36 takes over and provides the communication of the data from the sensors in question. The two levels of monitoring allow all the levels of malfunctioning of the hierarchized buses to be covered. The system consists of or comprises a master-slave architecture, the central unit being master and managing the exchanges with the control circuits.

In the embodiment illustrated, the control circuit 36 consists of or comprises an FPGA (for field-programmable gate array) integrated circuit. According to one illustrative embodiment, the flexible printed circuit 28 comprises at least two layers and, in the example illustrated, the two following layers: a circuit layer and a ground-plane layer. All of the buses 30, 32 and 34, sensors 22 and circuits 36 are located on a single layer, the circuit layer. Because of this architecture, the circuit 28 is flexible so as to mold as closely as possible to the shapes of the aircraft, such as for example the attack edges of the wing sections. In order to further increase its flexibility, the housing of the control circuit 36 is chosen to be of longilineal shape for example in the form of a parallelepipedal bar of rectangular cross section: the housing of the control circuit 36 is installed on the printed circuit 28 in such a manner that the longitudinal direction of the circuit 36 is orthogonal to the longitudinal direction of the printed circuit 28 (FIG. 4): the control circuit 36 is placed in a transverse manner to the printed circuit 28. In this way, by extending over a shorter length longitudinally, it allows a greater flexibility of the circuit 28.

As shown in FIG. 4, all the sensors having the same address, an interface component 44 is placed between each sensor 22 and the acquisition bus 34 and allows the address of the sensor to be modified in a different way for each sensor in such a manner that it may be identified by the associated control circuit or circuits and the central unit 19. The component may for example apply an offset, or a translation, to the address of the sensor, which offset is different for each sensor. The control circuit 36 controls the sensors 22 assigned to it, acquires their data and sends it via the data communication buses 30, 32 to the central unit.

The loopback device may take any possible type of form. In the embodiment illustrated, the bus 42 of the loopback device is connected to the buses 30 and 32 of the measurement device 10 by an anisotropic conducting film but could be connected in any other possible manner. Since the anisotropic conducting film is rigid, it ensures a good mechanical strength while at the same time providing the electrical conduction.

The extension device 18 is a virtually identical device to the device 10, namely it comprises a substrate and a flexible printed circuit 46 with the difference that the circuit 46 only comprises a single control circuit 36 and sensors 22 connected to the circuit 36 via at least one acquisition bus 48. The control circuit 36 is located at the link end 50, end of the circuit intended to be associated with a measurement device 10. In the same way as the loopback device, the extension device comprises a bus 42 designed to loop back the bus 30 onto the bus 32. The control circuit 36 of the extension device is connected to the bus 42 and to all of the sensors 22 via the acquisition bus or buses 48 and, in the embodiment illustrated, of which there are two. In the embodiment illustrated, the two acquisition buses 48 are parallel to each other and to the longitudinal direction of the circuit 46 and are provided on either side of the line 23 formed by the sensors. The sensors 22 are connected to one or the other of the buses 48 and, in the embodiment illustrated, from one sensor to a neighboring sensor alternately to one then to the other bus. As the sensors 22 are only connected to a single control circuit 36, the alternation of connection of the sensors onto the two buses 48 allows one sensor out of two to be conserved in the case of failure of one of the two buses. Because the circuit of the extension device only comprises sensors 22 linked via one or more buses 48, it is possible to cut the flex circuit to any given length (between the sensors 22). As shown in FIGS. 2 and 5, the bar-shaped control circuit 36 is connected to the measurement device 10 and the printed circuit 46 has a smaller width than the circuit 28 of the device 10. In the embodiment illustrated, the extension device is thus in the shape of a T. Because of a greater flexibility, the extension device allows the system to be adapted to any geometrical shape. As shown in FIG. 5, on more complex shapes with various surface features, it is even possible to only use extension devices that are daisy-chained. Being much smaller and with a much greater flexibility, they may be adapted to any given shape of surface onto which the measurement system is applied. A central unit 52 is connected to the control circuit of a first extension device and the control circuits of the following extension devices are connected to one another. The unit 52 may be the same as the unit 19 or otherwise. The system also operates according to a master-slave architecture: the unit manages the exchanges with the control circuits 36. The control circuit 36 of each extension device receives the measurements made by all of the sensors 22 and sends them to the central unit 19. Each sensor has its own address by virtue of the interface component 44 and can identify itself to the corresponding control circuit 36 and also to the unit 52. Each control circuit 36 has its own address and identifies itself to the central unit 19 with its address.

The disclosure herein is not limited to the field of aeronautics. The measurement system according to the disclosure herein could be used in many other technical fields and, for example, in the field of space, airborne, terrestrial, or maritime vehicles. The aircraft is considered as an airborne vehicle. It may also be used on a fixed object placed in a flow stream of air such as for example a part of a vehicle under test in a wind tunnel. It may also be used to characterize a wind tunnel by affixing the measurement device onto one or more walls of the latter, the wind tunnel being considered as a fixed object in a flow stream.

The subject matter disclosed herein can be implemented in or with software in combination with hardware and/or firmware. For example, the subject matter described herein can be implemented in software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A measurement device for being fixed onto a surface of a mobile object or of a fixed object situated in a flow stream comprising a substrate having accommodations with an opening in which sensors are located, the substrate comprising a cavity comprising a flexible printed circuit, wherein the circuit comprises hierarchized buses comprising two data communication buses at two longitudinal ends of the substrate and an internal data acquisition bus, the data acquisition bus linking control circuits, each control circuit being linked to one of the communication buses, the sensors being connected to the data acquisition bus in a distributed fashion on either side of each control circuit, all of the sensors between two control circuits configured to transmit their data to the two control circuits surrounding them.

2. The measurement device according to claim 1, wherein each control circuit comprises a housing of longilineal shape whose longitudinal direction is orthogonal to a longitudinal direction of the printed circuit.

3. The measurement device according to claim 1, wherein the sensors are disposed on a line parallel to the longitudinal direction of the circuit and parallel to the buses.

4. A measurement system comprising at least one measurement device according to claim 1, a central unit connected to the measurement device, and at least one end device comprising a line termination impedance.

5. The measurement system according to claim 4, comprising a loopback device comprising a loopback bus comprising ends, one of the ends connected to the data communication bus and another end connected to the data communication bus.

6. The measurement system according to claim 5, comprising an extension device comprising a flexible printed circuit comprising a single control circuit at one connection end of the circuit connected to the loopback bus and sensors connected to at least one acquisition bus of the extension device itself or themselves connected to the control circuit.

7. The measurement system according to claim 6, wherein the extension device comprises two acquisition buses, the sensors being connected to one or another of the buses.

8. The measurement system according to claim 6, wherein the loopback bus of the end device and extension device is connected to the data communication buses of the measurement device by an anisotropic conducting film.

9. A fixed or mobile object having a surface located in a flow stream equipped with the measurement system according to claim 4.

10. The object according to claim 9, wherein the object is an aircraft.

11. The object according to claim 10, wherein the loop-back ends of the measurement devices are installed upstream of a flow of the air around the aircraft.

12. A measurement method comprising:
providing a measurement system comprising:
a measurement device for being fixed onto a surface of a mobile object or of a fixed object situated in a flow stream comprising a substrate having accommodations with an opening in which sensors are located, the substrate comprising a cavity comprising a flexible printed circuit, wherein the circuit comprises hierarchized buses comprising two data communication buses at two longitudinal ends of the substrate and an internal data acquisition bus, the data acquisition bus linking control circuits, each control circuit being linked to one of the communication buses, the sensors being connected to the data acquisition bus in a distributed fashion on either side of each control circuit, all of the sensors between two control circuits configured to transmit their data to the two control circuits surrounding them;
a central unit connected to the measurement device; and
at least one end device comprising a line termination impedance;
wherein all of the sensors connected to the acquisition bus between two control circuits, respectively referred to as primary and secondary circuits, transmit their data to the two circuits via the acquisition bus, one of the circuits, the primary circuit, transmitting the data from the sensors to the unit via the communication buses.

13. The measurement method according to claim 12, wherein when the unit no longer receives any data from a primary circuit, it hands over to a corresponding circuit referred to as secondary circuit for the sensors in question.

14. The measurement method according to claim 12, wherein the circuit referred to as secondary circuit monitors activity of the bus connecting it to the associated primary circuit and in an absence of activity informs the unit which then requests the secondary circuit to transmit the data to it from the sensors in question.

\* \* \* \* \*